(12) United States Patent
Brunk et al.

(10) Patent No.: US 7,416,804 B2
(45) Date of Patent: Aug. 26, 2008

(54) PROCESS FOR MAKING PLANAR FRAMED MEMBRANE ELECTRODE ASSEMBLY ARRAYS, AND FUEL CELLS CONTAINING THE SAME

(75) Inventors: Donald H. Brunk, Boothwyn, PA (US); Deepak Perti, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 425 days.

(21) Appl. No.: 10/563,460

(22) PCT Filed: Jul. 22, 2004

(86) PCT No.: PCT/US2004/023667

§ 371 (c)(1), (2), (4) Date: Jan. 4, 2006

(87) PCT Pub. No.: WO2005/011041

PCT Pub. Date: Feb. 3, 2005

(65) Prior Publication Data
US 2006/0150398 A1  Jul. 13, 2006

(51) Int. Cl.
  *H01M 2/00* (2006.01)
  *H01M 8/10* (2006.01)
(52) U.S. Cl. .................................... 429/34; 429/32

(58) Field of Classification Search .................. 429/32, 429/34
See application file for complete search history.

(56) References Cited

U.S. PATENT DOCUMENTS

| | | | |
|---|---|---|---|
| 3,282,875 A | 11/1966 | Connolly et al. | |
| 4,358,545 A | 11/1982 | Ezzell et al. | |
| 4,940,525 A | 7/1990 | Ezzell et al. | |
| 5,525,436 A | 6/1996 | Savinell et al. | |
| 5,547,551 A | 8/1996 | Bahar et al. | |
| 5,716,727 A | 2/1998 | Savinell et al. | |
| 5,863,671 A * | 1/1999 | Spear et al. | 429/12 |
| 6,025,085 A | 2/2000 | Savinell et al. | |
| 6,099,988 A | 8/2000 | Savinell et al. | |
| 6,110,333 A | 8/2000 | Spethmann et al. | |
| 6,127,058 A * | 10/2000 | Pratt et al. | 429/30 |

* cited by examiner

*Primary Examiner*—Patrick Ryan
*Assistant Examiner*—Thomas H. Parsons
(74) *Attorney, Agent, or Firm*—Jane O. Hamby (57) ABSTRACT

The present invention relates to a process for making single or multiple planar array five layer membrane electrode assemblies utilizing array assemblies, as well as the array assemblies themselves, comprising proton exchange membrane (PEM), catalyst coated membranes (CCM) and gas diffusion layers (GDL), as well as gas diffusion electrodes (GDE) for use in fuel cells, wherein the process is practical, efficient and scalable.

36 Claims, 6 Drawing Sheets

PROCESS FOR MAKING PLANAR FRAMED MEMBRANE ELECTRODE ASSEMBLY ARRAYS, AND FUEL CELLS CONTAINING THE SAME

FIELD OF THE INVENTION

The present invention relates to a process for making single or multiple planar framed membrane electrode assembly arrays utilizing framed membrane electrode assembly components, and particularly to their use in fuel cells.

BACKGROUND OF THE INVENTION

Electrochemical cells generally include an anode and a cathode separated by an electrolyte. A well-known use of electrochemical cells is in a fuel cell (a cell that converts fuel and oxidants to electrical energy) that uses a proton exchange membrane (hereafter "PEM") as the electrolyte, for example direct methanol fuel cells. In such a cell, a reactant or reducing fluid such as methanol is supplied to the anode, and an oxidant such as oxygen is supplied to the cathode. The methanol electrochemically reacts at a surface of the anode to produce hydrogen ions and electrons. The electrons are conducted to an external load circuit and then returned to the cathode, while hydrogen ions transfer through the electrolyte to the cathode, where they react with the oxidant and electrons to produce water and release thermal energy.

Generally, within the fuel cell, the structure consisting of the PEM typically having its surfaces coated with a catalyst/carbon/binder layer and sandwiched between two microporous conductive layers (which function as the gas diffusion layers and current collectors) is known as the membrane electrode assembly (MEA).

Generally within the art, the process of making an MEA is well established, such that individual MEA's are produced manually or by automated processes. In the manual processes, each gas diffusion electrode and/or gas diffusion layer is individually applied for each element of the array. The disadvantage of such processes include, inter alia, a great degree of difficulty in aligning the elements by hand, which makes the process very time consuming and very expensive to implement. Furthermore, technologies developed to make conventional non-array MEA's cannot be readily extended to produce arrays due to the small dimensions, accurate alignment requirements and the electrical isolation between the array elements.

SUMMARY OF THE INVENTION

In a first aspect, the invention provides a process of forming at least one framed membrane electrode sub-assembly comprising:
a.) at least one framed membrane electrode assembly component comprising an external frame having a plurality of bridges, and at least one element having a plurality of outer edges, wherein the at least one element is connected to the external frame via the plurality of bridges, thereby forming a unitary structure;
b.) a carrier material having a plurality of apertures defined by a plurality of inner edges;
c.) securing the carrier material to the at least one framed membrane electrode assembly component, wherein the external frame, and plurality of outer edges of the at least one element are supported by the carrier material, thereby forming at least one framed membrane electrode sub-assembly.

The framed MEA component may be selected from the group consisting of a gas diffusion layer (GDL), a gas diffusion electrode (GDE), a catalyst coated membrane (CCM), and a proton exchange membrane (PEM).

Optionally, steps a.) to c.) may be repeated at least once to form additional framed membrane electrode sub-assemblies.

In a second aspect, the invention provides a process for making a framed membrane electrode assembly array, wherein the above identified process further comprises:
d.) separating the at least one element from the external frame, wherein the bridges and attached material are removed; and
e.) contacting the framed membrane electrode sub-assembly formed in the above process with additional components.

When the framed membrane electrode assembly component comprises a gas diffusion layer, the framed membrane electrode sub-assembly formed in step (c) is placed on either side of a catalyst-coated membrane followed by pressing to form the framed membrane electrode assembly array.

When the framed membrane electrode assembly component comprises a gas diffusion electrode, the framed membrane electrode assembly array is prepared by pressing together the sandwich formed by the framed membrane electrode sub-assemblies formed in step (c) and the ion-exchange membrane disposed there between.

When the framed membrane electrode assembly component comprises a catalyst coated membrane, step (e) precedes step (d), and framed membrane electrode assembly components each comprising a gas diffusion layer are placed on either side of the framed membrane electrode sub-assembly formed in step (c), and pressed to form the framed membrane electrode assembly array.

When the framed membrane electrode assembly component comprises a proton exchange membrane, step (e) precedes step (d), and framed membrane electrode assembly components each comprising a gas diffusion electrode are placed on either side of the framed membrane electrode sub-assembly formed in step (c), and pressed to form a framed membrane electrode assembly array.

In a third aspect, the invention provides a framed membrane electrode sub-assembly formed using the above process.

In a fourth aspect, the invention provides a framed membrane electrode assembly array comprising a framed membrane electrode sub-assembly formed using the above process.

In a fifth aspect, the invention provides a fuel cell comprising a framed membrane electrode assembly array, wherein the framed membrane electrode sub-assembly is formed using the above process.

DETAILED DESCRIPTION OF THE INVENTION

Fuel cells are electrochemical devices that convert the chemical energy of a fuel, such as methanol or a hydrogen gas, and an oxidant into electrical energy. Typical fuel cells comprise an anode (a negatively charged electrode), a cathode (a positively charged electrode) separated by an electrolyte that are formed as assemblages of membrane electrode assemblies (MEA).

The present invention is intended for use in the production of membrane electrode assemblies for use in fuel cells utilizing proton-exchange membranes (also known as "PEM"), for example direct methanol fuel cells, hydrogen fuel cells, reformed hydrogen fuel cells, as well as other liquid feed fuel cells (e.g. those utilizing feed fuels of ethanol, propanol, formic acid and the like), however the present invention is preferably used for the production of MEA's utilized in direct methanol fuel cells.

The present invention allows for the production of MEA's having a variety of applications utilizing micro-portable technology, for example, micro-portable direct methanol fuel cells, which can be packaged having a substantially flat geometry for use in consumer electronics such as, for example, laptop computers, cell phones, PDA's and other portable electronic devices.

As used herein, "planar" means that each MEA element in the framed membrane electrode assembly component is arranged such that its largest surface lies in substantially the same plane as the equivalent surfaces of adjacent or neighboring MEA's.

As used herein, "complementary framed membrane sub-assembly" means a sub-assembly that complements the first formed sub-assembly, e.g. if the first formed sub-assembly is the anode side framed membrane electrode sub-assembly, then the complementary sub-assembly would be the cathode side framed membrane electrode sub-assembly.

Figure 1:
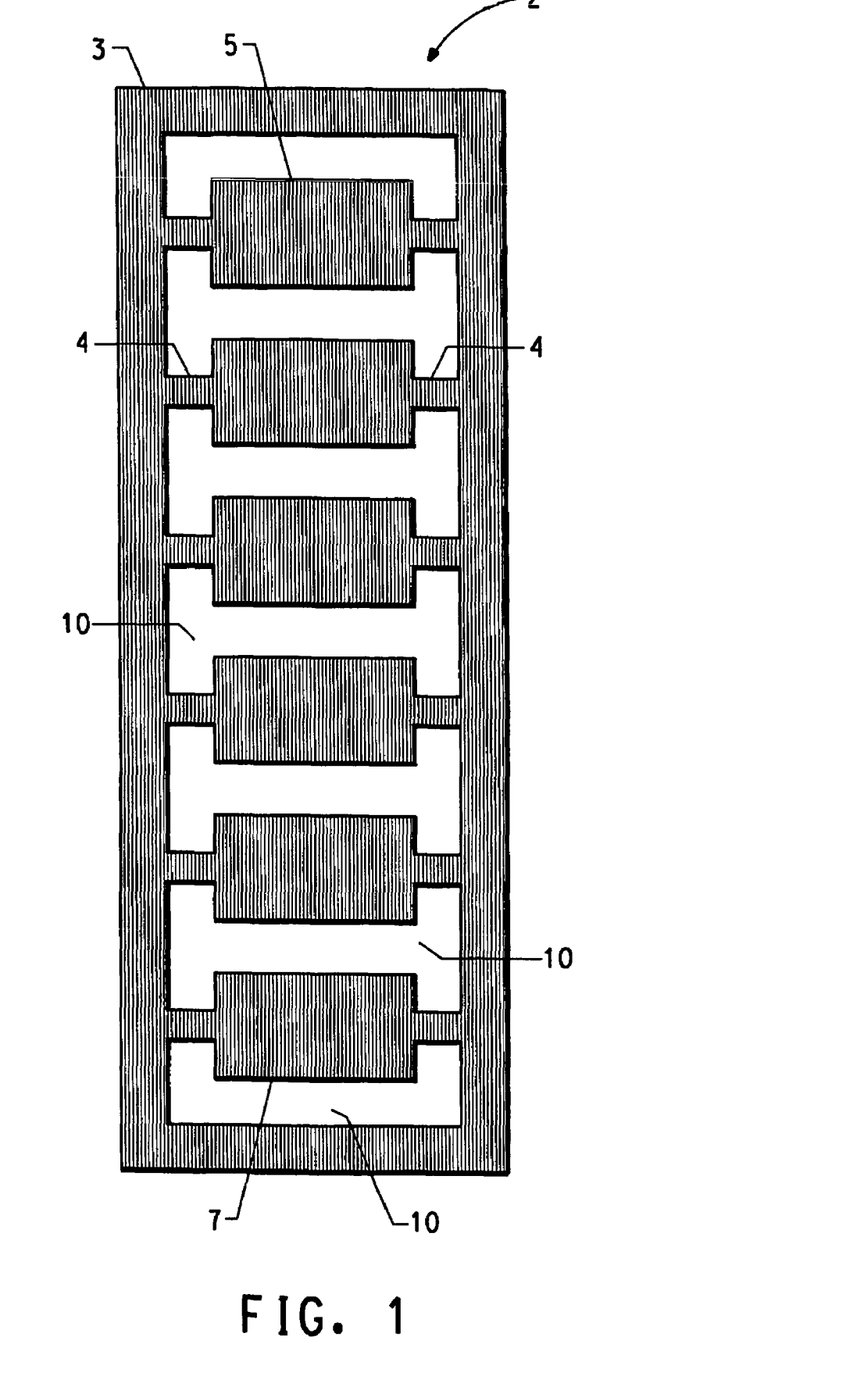
FIG. 1 depicts a top view of a planar-framed membrane electrode assembly component produced according to the present invention by die cutting a sheet of GDL, GDE, CCM or a PEM.
Figure 5:
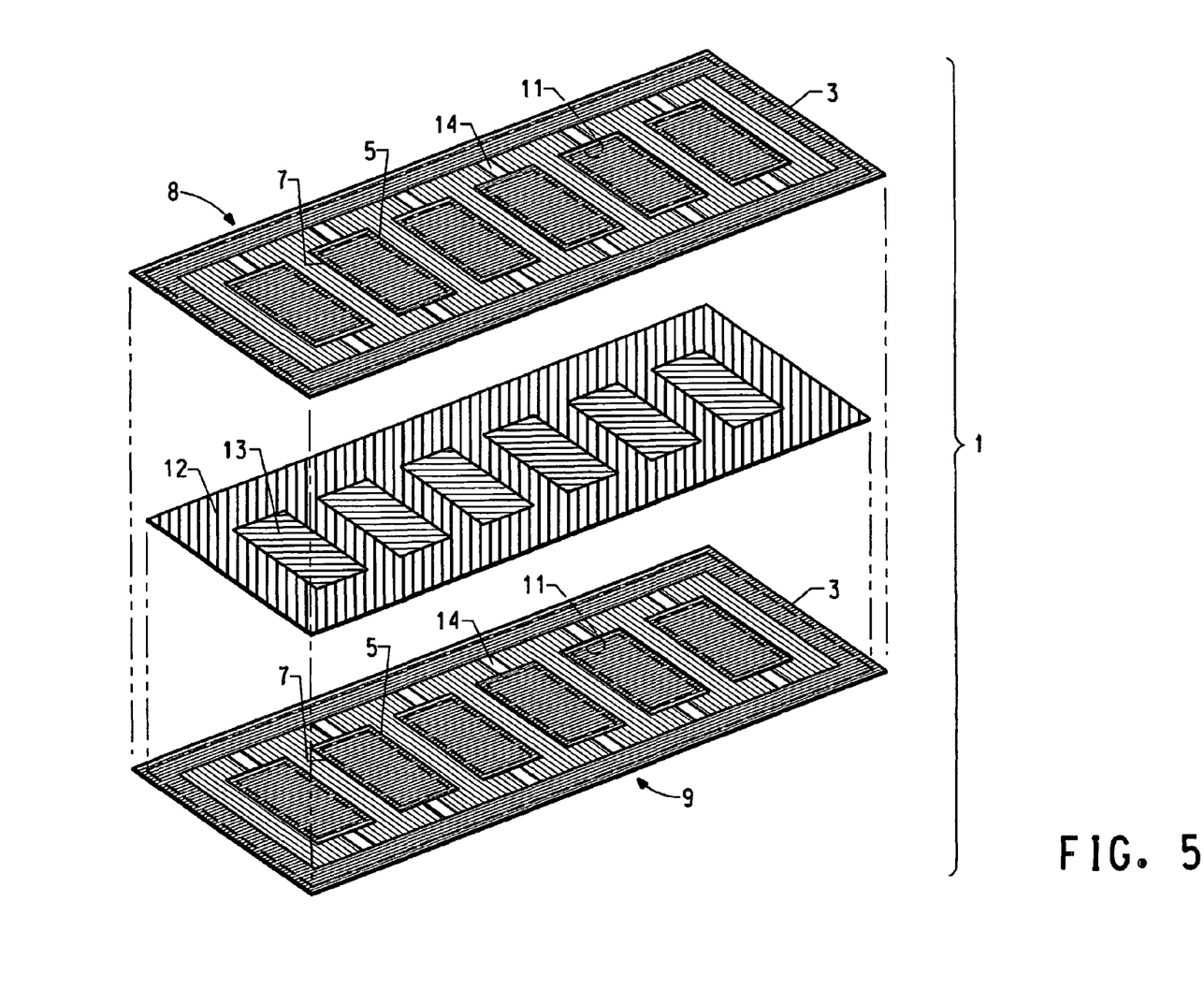
FIG. 5 depicts an exploded view of a framed membrane electrode assembly array comprising a CCM sandwiched between two framed membrane electrode sub-assemblies with bridges removed.

The present invention generally relates to a process of forming a framed membrane electrode assembly array (1), as shown in FIG. 5, comprising the following steps, wherein steps a.) and b.) may be performed in any order. In step (a), at least one framed membrane electrode assembly component (2), shown in FIG. 1, is formed. The framed membrane electrode assembly component (2) comprises an external frame (3) having a plurality of bridges or tabs (4), and at least one element (5) having outer edges, wherein the at least one element is connected to the external frame via the plurality of bridges, thereby forming a unitary structure. In step (b), a carrier material (6), shown in FIG. 2, having a plurality of apertures defined by a plurality of inner edges (11) is formed. In step (c), the carrier material (6) is secured to the at least one framed membrane electrode assembly component (2), wherein the external frame and the plurality of outer edges (7) of the at least one element are supported by the carrier material as shown in FIG. 3, thereby forming an framed membrane electrode sub-assembly.

In step (d), the at least one element is separated or electrically isolated from the external frame by removing the bridges and the material attached to said bridges (14). In the embodiment wherein the framed membrane electrode component is a gas diffusion electrode or a catalyst coated membrane, either an anode side (8) or cathode side (9), as seen in FIG. 5, may be formed.

Alternately, steps (a) to (c) may be repeated at least once to make additional framed membrane electrode subassemblies that complement the sub-assembly formed in step (c), e.g., if a cathode side sub-assembly is formed in step (c), the steps are repeated to form an anode side sub-assembly.

In step (e) a framed membrane electrode assembly array, as shown in FIG. 5, may be formed by contacting the framed membrane electrode sub-assembly formed in the above process with additional components.

When the framed membrane electrode assembly component comprises a gas diffusion layer, the framed membrane electrode sub-assembly formed in step (c) is placed on either side of a catalyst-coated membrane followed by pressing to form the framed membrane electrode assembly array.

When the framed membrane electrode assembly component comprises a gas diffusion electrode, the framed membrane electrode assembly array is prepared by pressing together the sandwich formed by the framed membrane electrode sub-assemblies formed in step (c) and the ion-exchange membrane disposed there between.

When the framed membrane electrode assembly component comprises a catalyst coated membrane, step (e) precedes step (d), and additional framed membrane electrode assembly components each comprising a gas diffusion layer are placed on either side of the framed membrane electrode sub-assembly formed in step (c), and pressed to form the framed membrane electrode assembly array.

When the framed membrane electrode assembly component comprises a proton exchange membrane, step (e) precedes step (d), and additional framed membrane electrode assembly components each comprising a gas diffusion electrode are placed on either side of the framed membrane electrode sub-assembly formed in step (c), and pressed to form a framed membrane electrode assembly array.

Figure 4:
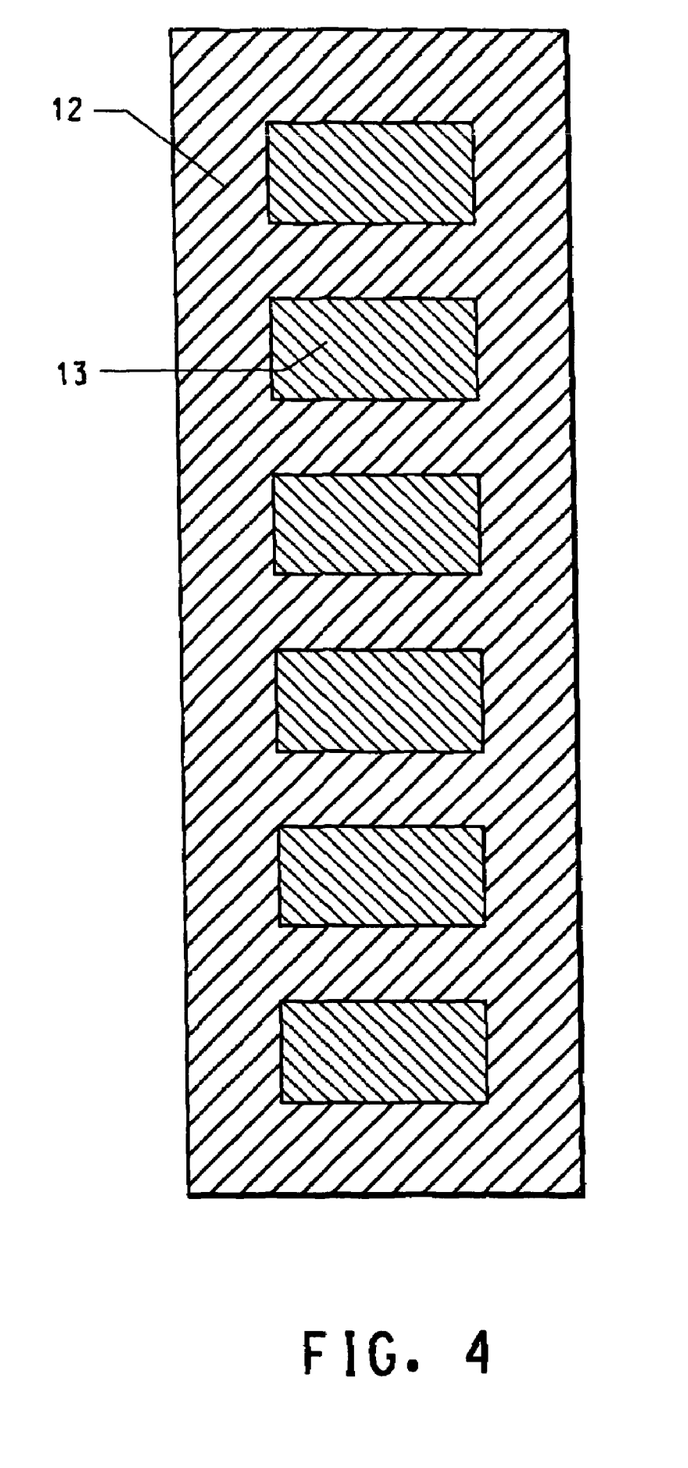
FIG. 4 depicts a catalyst-coated membrane (CCM) with selectively coated electrodes on a proton exchange membrane.

FIG. 4 shows a catalyst-coated membrane having selectively coated electrodes (12) on a PEM (13). The electrodes may be an anode with cathode on the other side or a cathode with anode on the other side.

Figure 6:
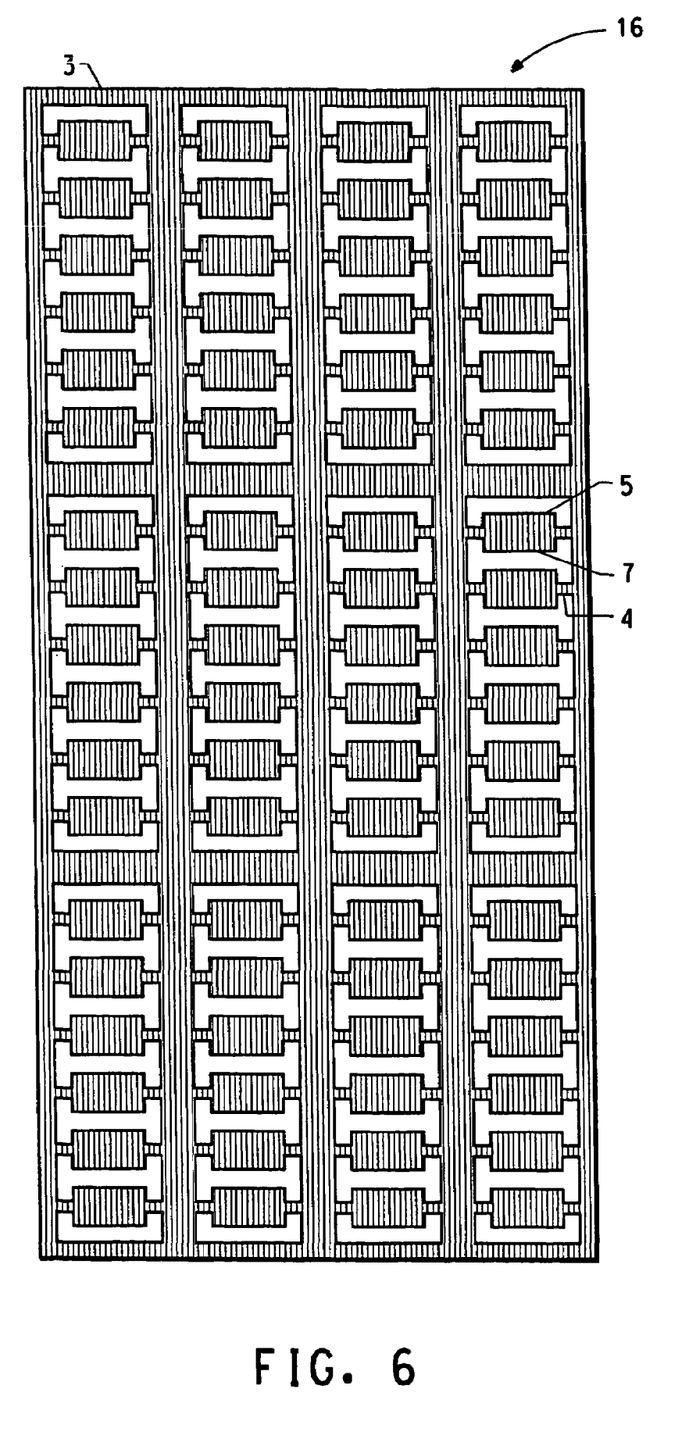
FIG. 6 depicts a plurality of framed MEA components.

The process according to the present invention is scalable meaning it is a process that allows for the production of as few as one framed membrane electrode assembly component and any number of the same. This is determined by the size of the framed membrane electrode sub-assembly and the size and type of equipment used to make it. A plurality of framed MEA components is shown in FIG. 6.

Generally, the forming of the at least one framed membrane electrode assembly component (2), shown in FIG. 1, and thus each of its sub-components, typically occurs using cutting means, such as by die cutting a sheet CCM or GDL, PEM and/or GDE to have a single or multiple element geometry using a steel rule die for forming the required shape (available DiTech, York Pa.), which are well known in the art for this type of application. Cutting dies typically include features providing for aligning of the elements such as, for example, spring pins or visual registration marks so that the cut outline is properly positioned with respect to the part. In forming the framed membrane electrode assembly component from a sheet of CCM or GDE, the sheet may be selectively coated to resemble the form of the at least one element so that when the die cutting occurs, valuable catalyst (typically comprising platinum) may be conserved.

The framed membrane electrode assembly component (2) formed in step a.) generally comprises at least one element (5) having outer edges, an external frame (3), a plurality of bridges (4) connecting the at least one element to the external frame, and a plurality of voids (10) defined by these components as shown in FIG. 1, wherein the framed membrane electrode assembly component is a CCM, GDL PEM and/or GDE. The bridges (4) act to stabilize the at least one element (5), so that the element(s) have the necessary alignment during the remainder of the process according to the present invention. The voids (10) allow for the electrical isolation of the at least one element(s) from the other elements in the array. The required alignment can be provided by the presence of alignment holes in the GDL or GDE. CCM's or other proton exchange membranes may also possess such alignment features, e.g. holes, so that the entire lay-up can be easily formed using alignment pins.

The at least one element typically forms either the anode or the cathode. The at least one element (5) may be of any shape, such as rectangular, circular, elliptical and the like, as well as a variety of shapes within the same framed membrane electrode assembly component. The shape of the element is dictated more by customer needs rather than fabrication process requirements. Typically, the at least one element has a rectangular shape.

The framed membrane electrode assembly component, and thereby the at least one element, plurality of bridges and external frame form a substantially unitary structure all formed from the same material.

Generally, the framed membrane electrode assembly component (2) may have a thickness ranging from about 100 to about 1000 microns. When the framed membrane electrode assembly component (2) is formed from a GDL or GDE, the thickness is in the range of about 100 to about 800 microns, more typically from about 150 to about 400 microns, most typically from about 200 to about 300 microns. When the framed membrane electrode assembly component (2) is formed from a PEM or CCM, the thickness is in the range of about 25 to about 375 microns, more typically from about 50 to about 250 microns, most typically from about 75 to about 200 microns. The framed membrane electrode assembly component (2) of the present invention, and thus each of its components, may comprise any conventionally known proton exchange membrane (which acts as the electrolyte (ion-exchanger) as well a gas diffusion layer (a barrier film which separates the gases in the anode and cathode compartments of the fuel cell or a porous, conductive sheet material), each of which may have a catalyst coated thereon, thereby forming a catalyst-coated membrane (CCM) and/or a gas diffusion electrode (GDE) respectively.

The gas diffusion layer can be coated on one or both surfaces with a thin porous layer usually referred to as the gas diffusion layer, typically comprising a film of carbon support particles and a binder, for example, fluoropolymers such as PTFE. Preferably, the gas diffusion layer is a woven or non-woven carbon fiber substrate; more preferably, carbon-based papers or cloths that can optionally be treated to exhibit hydrophilic or hydrophobic behavior.

A variety of techniques are known for the manufacture of a catalyst-coated membrane. Typical manufacturing techniques involve the application of a catalyst coating composition onto substrates such as the proton exchange polymer membrane. Methods for applying the catalyst onto the substrate include spraying, painting, patch coating, flexographic printing and screen-printing.

The proton exchange membrane for use in preparing a catalyst-coated membrane (CCM) can be a membrane of the same ion exchange polymers used in the electrocatalyst coating compositions. The membranes can be made by known extrusion or casting techniques and have thicknesses that can vary depending upon the intended application. The membranes typically have a thickness of 350 µm or less, although recently membranes that are quite thin, i.e., 50 µm or less, more typically 25 µm or less, are being employed. While the polymer can be in alkali metal or ammonium salt form, it is typical for the polymer in the membrane to be in acid form to avoid post treatment acid exchange steps. Suitable perfluorinated sulfonic acid polymer membranes in acid form are available under the trademark Nafion® by E. I. du Pont de Nemours and Company.

Reinforced perfluorinated ion exchange polymer membranes can also be utilized in CCM manufacture. Reinforced membranes can be made by impregnating porous, expanded PTFE (ePTFE) with ion exchange polymer. ePTFE is available under the tradename "Goretex" from W. L. Gore and Associates, Inc., Elkton, Md., and under the tradename "Tetratex" from Tetratec, Feasterville, Pa. Impregnation of ePTFE with perfluorinated sulfonic acid polymer is disclosed in U.S. Pat. Nos. 5,547,551 and 6,110,333 both of which are incorporated herein by reference.

Alternately, the proton exchange membrane can be a porous support. A porous support may improve mechanical properties for some applications and/or decrease costs. The porous support can be made from a wide range of components, including hydrocarbons and polyolefins, e.g., polyethylene, polypropylene, polybutylene, copolymers including polyolefins, and the like. Perhalogenated polymers such as polychlorotrifluoroethylene can also be used. The membrane can also be made from a polybenzimadazole polymer, for example, by casting a solution of polybenzimadazole in phosphoric acid ($H_3PO_4$) doped with trifluoroacetic acid (TFA) as described in U.S. Pat. Nos. 5,525,436, 5,716,727, 6,025,085 and 6,099,988.

Ion exchange polymers suitable for use in making the proton exchange membrane or catalyst coated membranes according to the present invention include, but are not limited to, highly fluorinated ion-exchange polymers. "Highly fluorinated" means that at least 90% of the total number of univalent atoms in the polymer are fluorine atoms. Most typically, the polymer is perfluorinated. It is typical for polymers used in fuel cells to have sulfonate ion exchange groups. The term "sulfonate ion exchange groups" as used herein means either sulfonic acid groups or salts of sulfonic acid groups, typically alkali metal or ammonium salts. For applications where the polymer is to be used for proton exchange such as in fuel cells, the sulfonic acid form of the polymer is typical. If the polymer in the electrocatalyst coating composition is not in sulfonic acid form when used, a post treatment acid exchange step can be used to convert the polymer to acid form prior to use.

Typically, the ion exchange polymer employed comprises a polymer backbone with recurring side chains attached to the backbone with the side chains carrying the ion exchange groups. Homopolymers or copolymers can be used. Copolymers are typically formed from one monomer that is a non-functional monomer and that provides carbon atoms for the polymer backbone, and a second monomer that provides carbon atoms for the polymer backbone and also contributes a side chain carrying a cation exchange group or its precursor, e.g., a sulfonyl halide group such a sulfonyl fluoride ($—SO_2F$), which can be subsequently hydrolyzed to a sulfonate ion exchange group. For example, copolymers of a first fluorinated vinyl monomer together with a second fluorinated vinyl monomer having a sulfonyl fluoride group ($—SO_2F$) can be used. Exemplary first fluorinated vinyl monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures of two or more thereof. Exemplary second monomers include fluorinated vinyl ethers with sulfonate ion exchange groups or precursor groups that can provide the desired side chain in the polymer. The first monomer can also have a side chain that does not interfere with the ion exchange function of the sulfonate ion exchange group. Additional monomers can also be incorporated into the polymers if desired.

Typical polymers for use in making catalyst coated substrates include polymers having a highly fluorinated, most typically a perfluorinated, carbon backbone with a side chain represented by the formula $-(O-CF_2CFR_f)_a-O-CF_2CFR'_fSO_3H$, wherein $R_f$ and $R'_f$ are independently selected from F, Cl and perfluorinated alkyl groups having 1 to 10 carbon atoms, wherein a=0, 1 or 2. Specific examples of suitable polymers include those disclosed in U.S. Pat. Nos. 3,282,875; 4,358,545; and 4,940,525. One exemplary polymer comprises a perfluorocarbon backbone and a side chain represented by the formula $-O-CF_2CF(CF_3)-O-CF_2CF_2SO_3H$. Such polymers are disclosed in U.S. Pat. No. 3,282,875 and can be made by copolymerization of tetrafluoroethylene (TFE) and the perfluorinated vinyl ether $CF_2=CF-O-CF_2CF(CF_3)-O-CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanging to convert to the acid, also known as the proton form. An exemplary polymer of the type disclosed in U.S. Pat. Nos. 4,358,545 and 4,940,525 has a side chain $-O-CF_2CF_2SO_3H$. The polymer can be made by copolymerization of tetrafluoroethylene (TFE) and the perfluorinated vinyl ether $CF_2=CF-O-CF_2CF_2SO_2F$, perfluoro(3-oxa-4-pentenesulfonyl fluoride) (POPF), followed by hydrolysis and acid exchange.

For perfluorinated polymers of the type described hereinabove, the ion exchange capacity of a polymer can be expressed in terms of ion exchange ratio ("IXR"). Ion exchange ratio is the number of carbon atoms in the polymer backbone in relation to the ion exchange groups. A wide range of IXR values for the polymer are possible. Typically, however, the IXR range for perfluorinated sulfonate polymers is from about 7 to about 33. For perfluorinated polymers of the type described hereinabove, the cation exchange capacity of a polymer can be expressed in terms of equivalent weight (EW). Equivalent weight (EW), as used herein, is the weight of the polymer in acid form required to neutralize one equivalent of NaOH. For a sulfonate polymer having a perfluorocarbon backbone and a side chain $-O-CF_2-CF(CF_3)-O-CF_2-CF_2-SO_3H$ (or a salt thereof), the equivalent weight range corresponding to an IXR of about 7 to about 33 is about 700 EW to about 2000 EW. A preferred range for IXR for such a polymer is from about 8 to about 23 (750 to 1500 EW), and a more preferred range is from about 9 to about 15 (800 to 1100 EW).

Any liquid medium compatible with the process for creating the proton exchange membrane, or for coating the catalyst onto the membrane can be used. When flammable constituents are to be employed, the medium can be selected to minimize process risks associated with such constituents, as the medium is in contact with the catalyst during use. The medium is also sufficiently stable in the presence of the ion exchange polymer that, in the acid form, has strong acidic activity. The liquid medium is typically polar for compatibility with the ion exchange polymer, and is preferably able to wet the membrane. While it is possible for water to be used as the liquid medium, the medium is preferably such that the ion exchange polymer coalesces upon drying and does not require post treatment steps such as heating to form a stable electrode layer.

A wide variety of polar organic liquids or mixtures thereof can serve as suitable liquid media for the electrocatalyst coating composition. Water in minor quantity can be present in the medium if it does not interfere with the coating process. Although some polar organic liquids can swell the membrane when present in sufficiently large quantity, the amount of liquid used in the electrocatalyst coating is preferably small enough that the adverse effects from swelling during the process are minor or undetectable. It is believed that solvents able to swell the proton exchange membrane can provide better contact and more secure application of the electrode to the membrane. A variety of alcohols are well suited for use as the liquid medium.

Typical liquid media include suitable $C_4$ to $C_8$ alkyl alcohols such as n-, iso-, sec- and tert-butyl alcohols; the isomeric 5-carbon alcohols such as 1, 2- and 3-pentanol, 2-methyl-1-butanol, 3-methyl, 1-butanol, etc.; the isomeric 6-carbon alcohols, such as 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc.; the isomeric $C_7$ alcohols and the isomeric $C_8$ alcohols. Cyclic alcohols are also suitable. Preferred alcohols are n-butanol and n-hexanol, and n-hexanol is more preferred.

The amount of liquid medium in the anode electrocatalyst varies and is determined by the type of medium employed, the constituents of the electrocatalyst, the type of coating equipment employed, desired electrode thickness, process speeds etc.

The preferred ion exchange polymer is the commercially available dispersion of the acid form of the perfluorinated sulfonic acid polymer, sold by E. I. du Pont de Nemours and Company under the trademark Nafion®, in a water/alcohol dispersion.

Any conventionally known catalyst utilized with fuel cell technology may be used in conjunction with the present invention. Appropriate catalysts for fuel cells typically depend upon the reactants selected. Suitable catalysts for use with the proton exchange membrane and gas diffusion electrode generally depend upon the reactants selected. However, typical catalyst materials for oxidation of hydrogen or methanol fuels include metals such as for example, Pd, Pt, Ru, Rh and alloys thereof. Commonly use catalysts include platinum supported on carbon particles. Different catalysts may be preferred for use in different types of fuel cells and electrochemical reactors.

Figure 2:
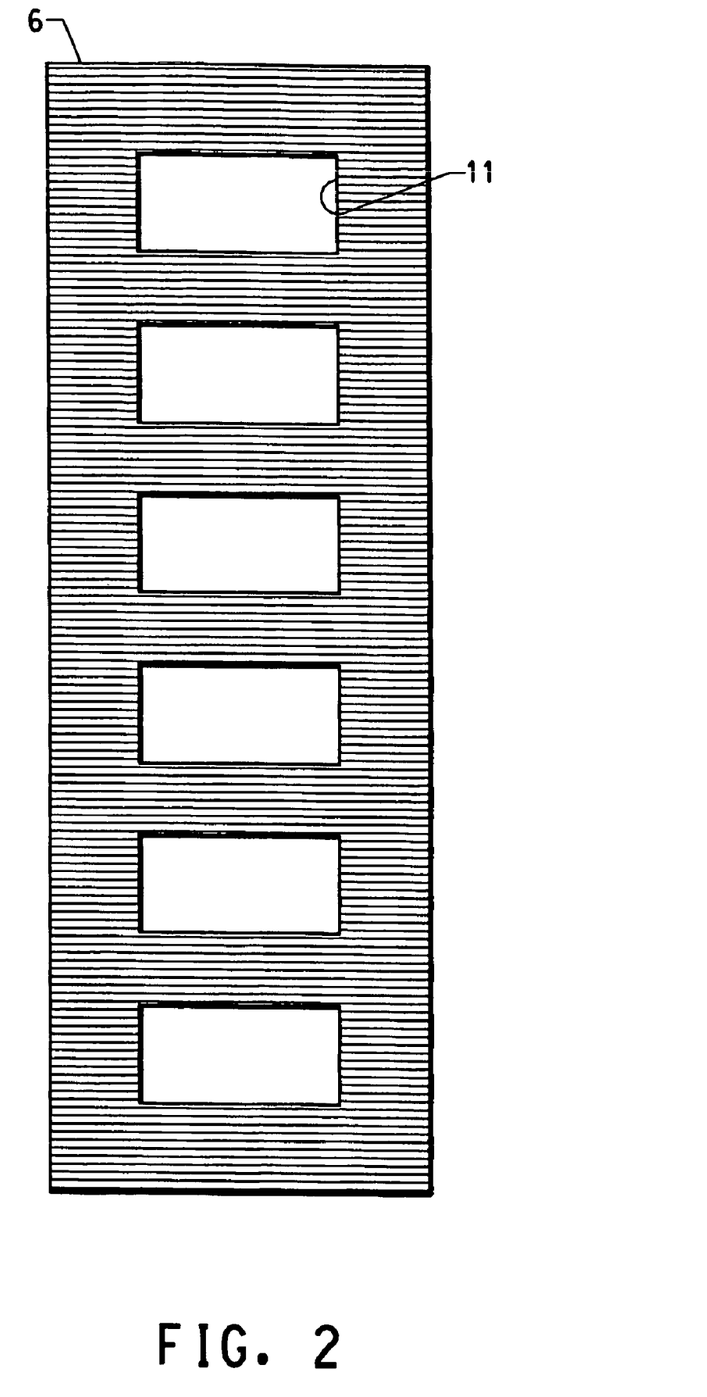
FIG. 2 depicts a carrier material configuration in accordance with the present invention.
Figure 3:
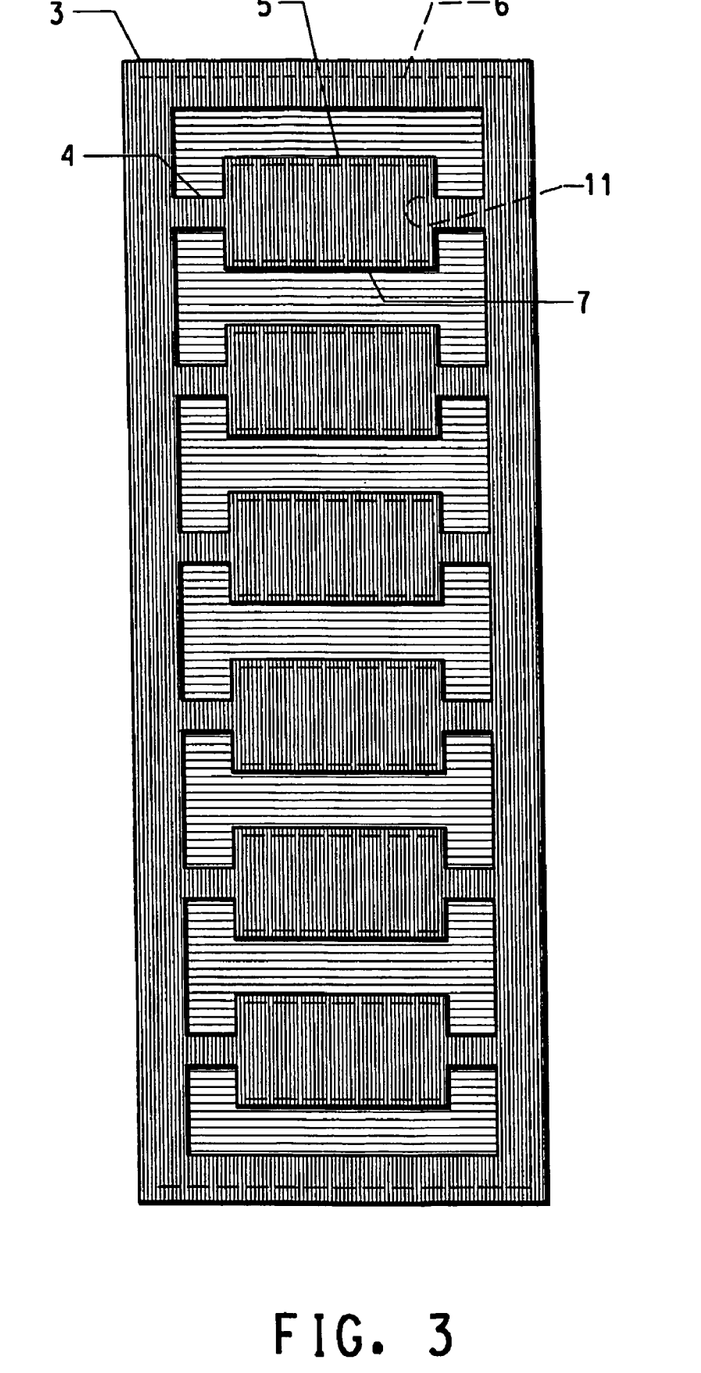
FIG. 3 depicts the placement and attachment of the framed membrane electrode assembly component on top of the carrier material.

The carrier material (6), as shown in FIG. 2, is formed using a die cutting process similar to that used to form the framed membrane electrode assembly component. The carrier material is also a substantailly unitary structure having at least one aperture that is defined by the inner edges of the carrier material. The size of the apertures in the carrier material may vary widely and are dependent upon the size of the at least one element of the framed membrane electrode assembly component in order to ensure proper adhesion between materials.

The carrier material (6) is configured such that the holes in the carrier material are slightly smaller than the element(s) (5) of the framed membrane electrode assembly component (2), such that only a small portion of the outer edge of the element is secured to the carrier material, where the outer edges of the at least one element overlap with the inner edges of the carrier material, thereby providing stability for the at least one element after the bridges have been removed.

The carrier material (6) suitable for use with the present invention may comprise a thermoplastic material or a composite of thermoplastic materials. An appropriate carrier material is one that allows it to adhere to the GDL, GDE, CCM and PEM.

Suitable thermoplastic materials for use with the present invention include, but are not limited to, melt-processible fluoropolymers (i.e., Teflon® FEP 100 and Teflon® PFA 340, both available from E. I. du Pont de Nemours and Co., Wilmington Del.); partially fluorinated polymers such as, for example, polyvinylidene fluoride (specific examples being Kynar® 710 and Kynar Flex® 2801 manufactured by Atofina Chemicals, King of Prussia, Pa.); thermoplastic fluoroelastomers (i.e., Kalrez® and Viton®, manufactured by E. I. du Pont de Nemours & Company, Inc., Wilmington, Del.); aromatic condensation polymers such as polyaryl(ether ketone)'s (i.e., polyaryl(ether ketone) manufactured by Victrex Manufacturing Limited, Lancashire, Great Britain); modified polyethylene and modified polypropylene (i.e., Bynel® 4105 and Bynel® 50E561 respectively, both manufactured by E. I. duPont de Nemours and Company, Wilmington Del.); polyethylene (i.e., Sclair® 2318 manufactured by NOVA Chemicals Corporation, Calgary, Alberta, Canada); thermoplastic elastomers (i.e., Hytrel®); liquid-crystal polymers (i.e., Zenite® liquid-crystal polyester), and aromatic polyamides (i.e., Zytel® HTN) (all available from E. I. duPont de Nemours and Company, Wilmington, Del.). Preferably, the thermoplastic material comprises Bynel® 4105.

The melting point of the thermoplastic material should preferably be higher than the maximum temperature attainable in the fuel cells (i.e., about 95° C. for a direct methanol fuel cell) and should be lower than the temperature that the polymeric electrolyte membrane can withstand (i.e., about 150° C. for Nafion®). The material should adhere well to various GDL's and polymeric electrolyte membranes by hot pressing.

Suitable thermoplastic composite materials include, but are not limited to those thermoplastic materials noted above, which encapsulate inert fillers or a reinforcing layer comprising a material such as, for example, fiber glass, glass cloth, Kevlar® paper, Kapton® films, (the Kevlar and Kapton both being available from E. I. duPont de Nemours and Company, Wilmington, Del.) and the like. The reinforcing layer should be capable of withstanding higher temperatures than the melting point of the thermoplastic material in order to provide dimensional stability and, if necessary, electric insulation to finished parts.

The carrier material (6) typically has a thickness ranging from about 25 microns to a maximum thickness of GDL material under compressive force used in the fuel cell applications. Preferably the carrier material has a thickness of about 10 microns to about 125 microns, more typically about 25 microns to about 100 microns and most preferably the thickness is about 50 microns.

Securing the carrier material (6) to the framed membrane electrode assembly component (2) and the edges (7) of the element(s) (5) typically occurs through bonding methods, including adhesive and mechanical bonding. An adhesive bond may be achieved by pressing the parts together, and optionally, applying heat if necessary to activate the adhesive. The parts may be pressed together between optionally heated platens of a hydraulic or pneumatic press, between optionally heated rolls of a laminator, or while being conveyed between the belts of a belt press, wherein the belts pass through optional heating and cooling zones. A typical hot pressing operation, for example, can be done in a 100 Ton press (manufactured by PHI, City of Industry, Calif.). Variables in the above-described processes include pressure, time and temperature, wherein one skilled in the art will recognize and understand the adjustments and appropriate values for each depending upon the materials used in the process. Typically, the adhesion between the framed membrane electrode assembly component and the carrier material is sufficient to withstand the subsequent process steps without damaging the integrity of the carrier material or framed membrane electrode assembly component.

As noted above, when securing the carrier material to the framed membrane electrode assembly component, in order to provide proper alignment and stability of the at least one element throughout the process of the present invention, the outer edges of the at least one element overlap to some degree with the inner edges of the carrier material.

Separating or electrically isolating the at least one elements (5) from the remainder of elements, if present, is typically performed using a cutting means, such as a die punch, where the plurality of bridges, and the carrier material secured thereto, are removed from the framed membrane electrode sub-assembly (3) to form openings (14), as shown in FIG. 5. However die cutting or other conventional methods may also be used. Alternatively, depending upon the materials utilized, the carrier material, as well as the framed membrane electrode assembly component, may have perforations allowing for the removal of the bridges. Although the bridges are removed, thereby separating the at least one element from the other elements, the carrier material remains adhered or bonded to the framed membrane electrode assembly component where the inner edges of the carrier material overlap with the outer edges of the at least one element. This step is utilized for making both the cathode side (9) and anode side (8) of the framed MEA array shown in FIG. 5. The size of holes cut in the carrier material and framed membrane electrode assembly component is not critical, so long as the at least one element is electrically isolated and the framed membrane electrode assembly component maintains its shape, while the external frame and at least a portion of the element(s) remain adhered or bonded to the carrier material.

A framed MEA array can be converted into a fuel cell assembly by a.) trimming away the external frames (3) shown in FIG. 5, b.) applying a gasket, for example silicone rubber (Furan®-Type 1007, obtained from Stockwell Rubber Company) cut to shape to cover the exposed area of the membrane of the MEA, by placing it on either side of the framed MEA Array (taking care to avoid overlapping of each element (5) and the gasket material), c.) sandwiching the gasketed framed MEA Array between anode and cathode flow field plates which may be equipped with anode inlet, anode outlet, catholyte gas inlet, catholyte gas outlet, end blocks, tied together with tie rods, or electrically insulating adhesive layers, and metal current collectors. The elements (5) of the framed MEA Array (shown in FIG. 5) may be connected electrically in series or parallel based on the power output of the target application.

The fuel cell assembly is typically connected to a fuel cell system (not shown). The fuel cell system typically comprises of a supply of air for use as catholyte gas, a load box to regulate the power output from the fuel cell, a fuel, e.g. methanol, solution tank to hold the feed anolyte solution, a liquid pump to feed the anolyte solution to the fuel cell at the desired flow rate, an exhaust container to collect the spent anolyte solution, and a power switch.

To operate the fuel cell system first it is brought to the operating temperature and then fuel such as a methanol solution and air are introduced into the anode and cathode compartments through inlets at the desired flow rates. Current generated passes through the external load to complete the electric circuit.

EXAMPLES

The present invention may be carried out as specifically set forth below and is further defined in the following Example. It should be understood that this Example, while indicating preferred embodiments of the invention, are given by way of illustration only. From the above discussion and this Example, one skilled in the art can ascertain the essential characteristics of this invention, and without departing from the spirit and scope thereof, can make various changes and modifications of the invention to adapt it to various usage and conditions.

Procedure:
1. 1 piece of anode gas diffusion layer was die cut, measuring 137 mm×112 mm, using the design in FIG. 1.
2. 1 piece of cathode diffusion layer was die cut, measuring 137 mm×112 mm, using the design in FIG. 1.
3. 2 pieces of overlay material were die cut from Bynel® 4105 polymer films (137 mm×112 mm), 0.064 mm thickness, using the design in FIG. 2 (Alternatively, 2 pieces of overlay material cut from fiberglass-reinforced Bynel® 4105 polymer films (137 mm×112 mm), ~0.06 mm thickness, using design in FIG. 2).
4. The items listed below were stacked between a pair of ~¼" thick metal plates (minimum 160 mm×130 mm):
   1—5 mil Teflon® 1000A release film
   1—Anode gas diffusion layer, with the side designed to face the electrode facing up (toward the overlay).
   1—Bynel® 4105 polymer film or reinforced Bynel® polymer film, cut by design in FIG. 2.
   1—5 mil Teflon® 1000A release film
5. The stack/plates were placed in a hydraulic press preheated to 130° C.
6. 6000 lb of force was applied on the plates for 3.5 min.
7. While maintaining the applied force, the plates were cooled to room temperature. The anode side framed membrane electrode sub-assembly was removed and set aside.
8. The items listed below were stacked between a pair of ~¼" thick metal plates (200 mm×200 mm):
   1—5 mil Teflon® 1000A release film
   1—Cathode gas diffusion layer, with the side designed to face the electrode facing up (toward the overlay). In this example, the side coated with a microporous layer faced upwards.
   1—Bynel® 4105 polymer film or reinforced Bynel® polymer film, cut by design in FIG. 2.
   1—5 mil Teflon® 1000A release film
9. The stack/plates were placed in a hydraulic press preheated to 130° C.
10. 6000 lb of force was applied on the plates for 3.5 min.
11. While maintaining the applied force the plates were cooled to room temperature. The cathode side framed membrane electrode sub-assembly was removed and set aside.
12. Holes were punched in the anode and cathode side framed membrane electrode sub-assembly to remove the bridges. See FIG. 5.
13. The items set forth below were then stacked between a pair of ~¼" thick metal plates (200 mm×200 mm):
    1—5 mil Teflon® 1000A release film
    1—Cathode side framed membrane electrode sub-assembly, with the side designed to face the electrode facing up (toward the CCM). In this example, the side with the Bynel® 4105 polymer was placed facing upwards.
    1—CCM with overall dimensions of 88 mm×112 mm and electrode area as shown in FIG. 4. The cathode side of the CCM must be placed facing down.
    1—Anode side framed membrane electrode sub-assembly, with the side designed to face the electrode facing down (toward the CCM). In this example, the side with the Bynel® 4105 polymer was placed facing downwards.
    1—5 mil Teflon® 1000A release film
13. The stack/plates were placed in a hydraulic press preheated to 165° C.
14. 8000 lb of force was applied on the plates for 9 min.
15. While maintaining the applied force, the plates were cooled to room temperature.

What is claimed is:

1. A process of forming at least one framed membrane electrode sub-assembly comprising:
   a.) forming at least one framed membrane electrode assembly component comprising an external frame having a plurality of bridges, and at least one element having a plurality of outer edges, wherein the at least one element is connected to the external frame via the plurality of bridges, thereby forming a unitary structure;
   b.) forming a carrier material having a plurality of apertures defined by a plurality of inner edges; and
   c.) securing the carrier material to the at least one framed membrane electrode assembly component, wherein the external frame, and plurality of outer edges of the at least one element are supported by the carrier material, thereby forming at least one framed membrane electrode sub-assembly.

2. The process of claim 1 wherein the at least one framed membrane electrode assembly component is selected from the group consisting of a proton exchange membrane, a gas diffusion layer, a gas diffusion electrode and a catalyst coated membrane.

3. The process of claim 2 wherein the gas diffusion electrode comprises a gas diffusion layer and an electrode.

4. The process of claim 2 wherein the catalyst coated membrane comprises a proton exchange membrane and an electrode.

5. The process of claim 3 or 4, wherein the electrode is an anode or cathode.

6. The process of claim 1, wherein the framed membrane electrode assembly component has a thickness of about 150 microns to about 1000 microns.

7. The process of claim 1, wherein the at least one element is rectangular.

8. The process of claim 1, wherein the carrier material comprises a thermoplastic material, a thermoplastic composite material or mixtures thereof.

9. The process according to claim 8, wherein the thermoplastic material is selected from the group consisting of melt-processible fluoropolymers, polyvinylidene fluoride, thermoplastic fluoroelastomers, aromatic condensation polymers, modified polyethylene, modified polypropylene, polyethylene, thermoplastic elastomers, liquid-crystal polymers, and aromatic polyamides.

10. The process according to claim 8, wherein the thermoplastic composite material comprises at least one thermoplastic material containing a filler or reinforcing layer, wherein the thermoplastic material is selected from a melt-processible fluoropolymers, polyvinylidene fluoride, thermoplastic fluoroelastomers, aromatic condensation polymers, modified polyethylene, modified polypropylene, polyethylene, thermoplastic elastomers, liquid-crystal polymers, and aromatic polyamides, and wherein the filler or reinforcing material is selected from the group of fiber glass and glass cloth.

11. The process according to claim 1, wherein the carrier material has a thickness ranging from about 10 microns to about 125 microns.

12. The process of claim 1 further comprising: repeating steps (a) to (c) to form additional framed membrane electrode sub-assemblies.

13. The process of claim 12 wherein the framed membrane electrode sub-assembly formed by repeating steps (a) to (c), is a complementary framed membrane electrode sub-assembly to the first formed framed membrane electrode sub-assembly.

14. The process of claim 1 further comprising:
   d.) separating the at least one element from the external frame, wherein the bridges and attached material are removed; and
   e.) contacting the framed membrane electrode sub-assembly with additional components to form a framed membrane electrode assembly array.

15. The process of claim 14 wherein the at least one framed membrane electrode assembly component comprises a gas diffusion layer, and the framed membrane electrode sub-assembly formed in step (c) is placed on either side of a catalyst coated membrane followed by pressing to form a framed membrane electrode assembly array.

16. The process of claim 14 wherein the at least one framed membrane electrode assembly component comprises a gas diffusion electrode, and the framed membrane electrode assembly array is prepared by pressing together a sandwich formed by the framed membrane electrode sub-assemblies formed in step (c) and an ion-exchange membrane disposed there between.

17. The process of claim 14 wherein the at least one framed membrane electrode assembly component comprises a catalyst coated membrane, step (e) precedes step (d), and framed membrane electrode assembly components each comprising a gas diffusion layer are placed on either side of the framed membrane electrode sub-assembly formed in step (c), followed by pressing to form the framed membrane electrode assembly array.

18. The process of claim 14 wherein the at least one framed membrane electrode assembly component comprises a proton exchange membrane, step (e) precedes step (d), and framed membrane electrode assembly components each comprising a gas diffusion electrode are placed on either side of the framed membrane electrode sub-assembly assembly formed in step (c), followed by pressing to form the framed membrane electrode assembly array.

19. The process of claim 14 wherein the framed membrane electrode assembly component has a thickness of about 150 microns to about 1000 microns.

20. The process of claim 14 wherein the at least one element is rectangular.

21. The process of claim 14 wherein the carrier material comprises a thermoplastic material, a thermoplastic composite material, or mixtures thereof.

22. The process of claim 21 wherein the thermoplastic material is selected from the group consisting of melt-processible fluoropolymers, polyvinylidene fluoride, thermoplastic fluoroelastomers, aromatic condensation polymers, modified polyethylene, modified polypropylene, polyethylene, thermoplastic elastomers, liquid-crystal polymers, and aromatic polyamides.

23. The process according to claim 21, wherein the thermoplastic composite material comprises at least one thermoplastic material containing a filler or reinforcing layer, wherein the thermoplastic material is selected from a melt-processible fluoropolymers, polyvinylidene fluoride, thermoplastic fluoroelastomers, aromatic condensation polymers, modified polyethylene, modified polypropylene, polyethylene, thermoplastic elastomers, liquid-crystal polymers, and aromatic polyamides, and wherein the filler or reinforcing material is selected from the group of fiber glass and glass cloth.

24. The process of claim 14 wherein the carrier material has a thickness ranging from about 10 microns to about 125 microns.

25. The process of claim 14 wherein a plurality of framed membrane electrode arrays are formed.

26. The process of claim 1 wherein a plurality of framed membrane electrode sub-assemblies are formed.

27. A framed membrane electrode sub-assembly prepared by a process comprising:
   a.) forming at least one framed membrane electrode assembly component comprising an external frame having a plurality of bridges, and at least one element having a plurality of outer edges, wherein the at least one element is connected to the external frame via the plurality of bridges, thereby forming a unitary structure;
   b.) forming a carrier material having a plurality of apertures defined by a plurality of inner edges;
   c.) securing the carrier material to the at least one framed membrane electrode assembly component, wherein the external frame, and plurality of outer edges of the at least one element are supported by the carrier material, thereby forming at least one framed membrane electrode sub-assembly.

28. The framed membrane electrode sub-assembly of claim 27 wherein the framed membrane electrode assembly component is selected from the group consisting of a proton exchange membrane, a gas diffusion layer, a gas diffusion electrode, and a catalyst coated membrane.

29. A framed membrane electrode assembly array comprising a framed membrane electrode sub-assembly prepared by a process comprising:
   a.) forming at least one framed membrane electrode assembly component comprising an external frame having a plurality of bridges, and at least one element having a plurality of outer edges, wherein the at least one element is connected to the external frame via the plurality of bridges, thereby forming a unitary structure;
   b.) forming a carrier material having a plurality of apertures defined by a plurality of inner edges;
   c.) securing the carrier material to the at least one framed membrane electrode assembly component, wherein the external frame, and plurality of outer edges of the at least one element are supported by the carrier material, thereby forming at least one framed membrane electrode sub-assembly.

30. A fuel cell comprising a membrane electrode assembly produced according to the process of claim 14.

31. The fuel cell of claim 30 wherein the frame is removed.

32. The fuel cell of claim 30 wherein the process for producing the membrane electrode assembly further comprises:
   d.) separating the at least one element from the external frame, wherein the bridges and attached material are removed; and
   e.) contacting the framed membrane electrode sub-assembly with additional components to form a framed membrane electrode assembly array.

33. The fuel cell of claim 32, wherein the at least one framed membrane electrode assembly component comprises a gas diffusion layer, and the framed membrane electrode sub-assembly formed in step (c) is placed on either side of a catalyst coated membrane followed by pressing to form the framed membrane electrode assembly array.

34. The fuel cell of claim 32, wherein the at least one framed membrane electrode assembly component comprises a gas diffusion electrode, and a framed membrane electrode assembly array is prepared by pressing together a sandwich formed by the framed membrane electrode sub-assemblies formed in step (c) and an ion-exchange membrane disposed there between.

35. The fuel cell of claim 32 wherein the at least one framed membrane electrode assembly component comprises a catalyst coated membrane, step (e) precedes step (d), and framed membrane electrode assembly components each comprising a gas diffusion layer are placed on either side of the framed membrane electrode sub-assembly formed in step (c), followed by pressing to form the framed membrane electrode assembly array.

36. The fuel cell of claim 32 wherein the at least one framed membrane electrode assembly component comprises a proton exchange membrane, step (e) precedes step (d), and framed membrane electrode assembly components each comprising a gas diffusion electrode are placed on either side of the framed membrane electrode sub-assembly formed in step (c), followed by pressing to form the framed membrane electrode assembly array.

\* \* \* \* \*